No Printed Specification Available
9144X
J. Woodward,
Riding Saddle.
Patented Oct. 6, 1835.
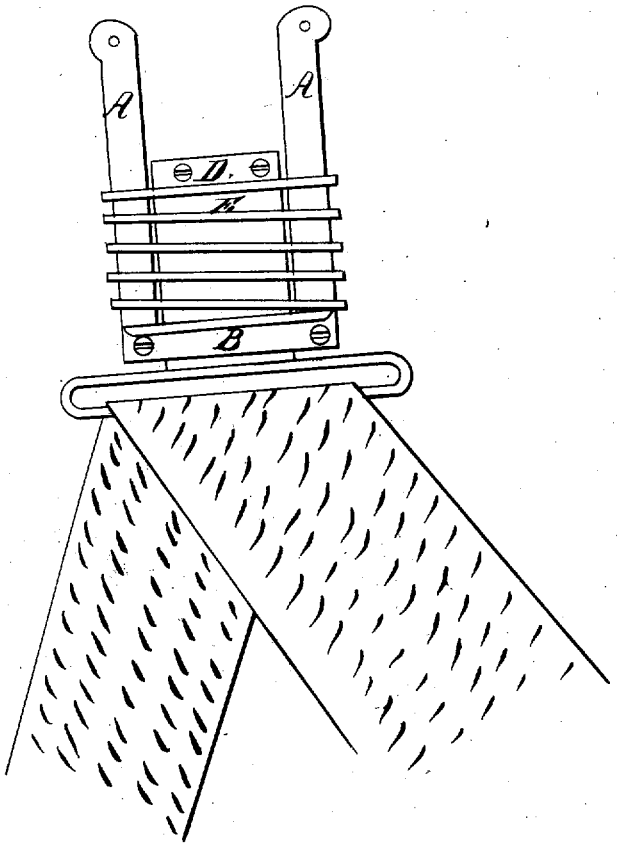
N. PETERS, PHOTO-LITHOGRAPHER, WASHINGTON, D. C.

Oct. 6 1835

42

9144X

Joel Woodward of Marshalton Pennsylvania.

Letters Patent.

The schedule referred to in these Letters Patent, and making part of the same containing a description in the words of the said Joel Woodward himself of his improvement in the spring saddle.

Be it known that I Joel Woodward of Marshalton, Chester County, State of Pennsylvania, have made an improvement in the spring saddle, which is described as follows, reference being had to the annexed drawing making part of this specification. A represents the metallic frame fastened permanently to the front of the saddle tree by nails or rivets.

B, plate forming the lower part of the frame secured by screws, & which can be taken off and put on at pleasure, C, slide to which the webbing is screwed passing through the spring and resting upon the same, D. small plate screwed to the end of the slide which can also be removed at pleasure, when the slide is required to be seperated from the spring. E the spring made from a stout bar of steel and bent so as to encircle the frame and slide and resting with one end against the plate B, and its other end against the plate C, The operation of this apparatus is similar to others in use, viz, when the weight of the rider is brought down upon the seat of the saddle the spring is contracted and when removed it is extended thus accommodating itself to the motions of the rider, and producing a very easy, cheap and comfortable saddle.

What I claim as my invention and for which I ask a patent, is having the slide in one peice with the moveable plates secured to it by screws so that they may be put on and taken off at pleasure, when the spring breaks; thus avoiding the necessity of tearing the saddle to peices

Witnesses
Wm P. Elliot
C.H.W. Wharton

Joel Woodward

Drawing

Ex'
Ch.S.M.

375 ...